May 19, 1970 N. D. SUTHERLAND 3,512,430
DIFFERENTIAL GEAR ASSEMBLIES WITH ANTI-BACKLASH MEANS
Filed June 19, 1968 2 Sheets-Sheet 2

Inventor
Norman Donald Sutherland
By Hall, Pollard & Vande Sande
Attorney

United States Patent Office 3,512,430
Patented May 19, 1970

---

3,512,430
DIFFERENTIAL GEAR ASSEMBLIES WITH ANTI-BACKLASH MEANS
Norman Donald Sutherland, Prestbury, Cheltenham, England, assignor to Smith Industries Limited, London, England, a British corporation
Filed June 19, 1968, Ser. No. 738,212
Claims priority, application Great Britain, June 20, 1967, 28,510/67
Int. Cl. F16h *1/40, 55/18*
U.S. Cl. 74—713
8 Claims

ABSTRACT OF THE DISCLOSURE

A bevel gear differential has two main bevel-gears rotatably-mounted on a rotatable shaft and both engaged by two bevel pinions that rotate with the shaft. The rotational axes of the pinions extend radially of the shaft and angular displacement of one of them relative to the other is urged by a screw or spring to eliminate backlash.

---

Figure 1:
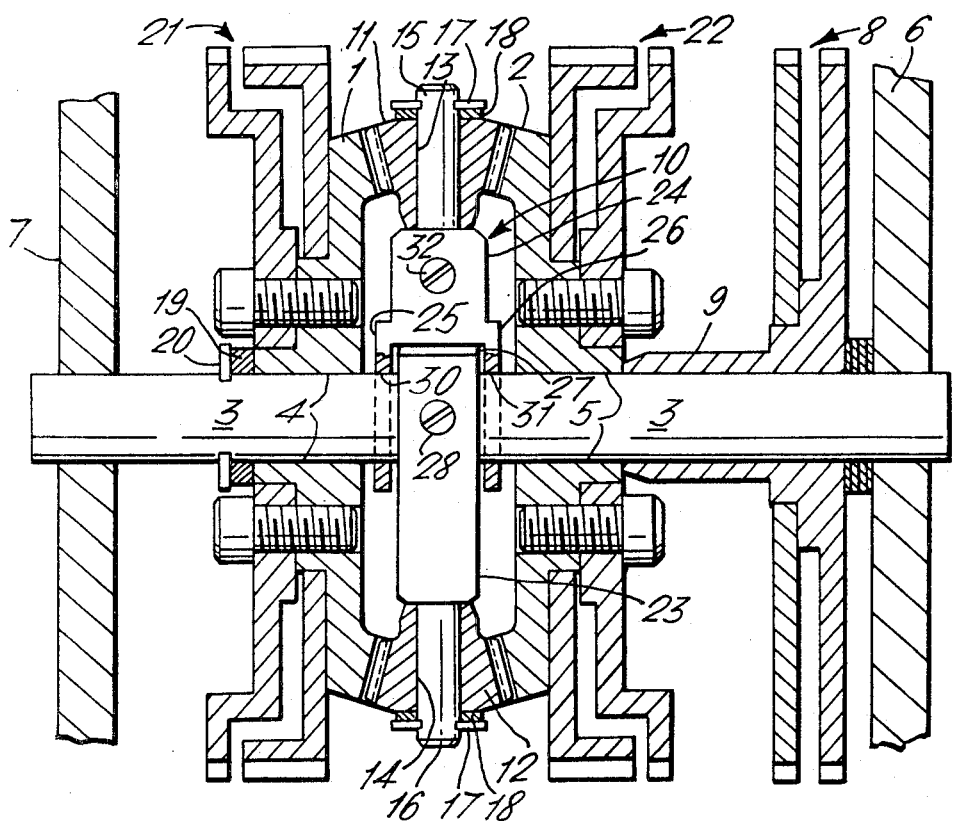

This invention relates to differential gear assemblies.

The invention is particularly, although not exclusively, concerned with bevel-gear differentials (that is to say, differential gear assemblies using bevel-gears) that are of a form which is suitable for use, for example in a servo system, where it is essential that backlash in the differential be reduced to a minimum.

Backlash in a conventional bevel-gear differential arises from two distinct sources: clearances between intermeshing teeth of the constituent bevel-gears, that is to say of the main bevel-gears and their one or more so-called bevel-pinions, and clearances between the bearing surfaces of the gears and the shafts on which the gears are rotatably mounted. In order to reduce the backlash it is common to provide for axial adjustment of the one or more pinions of the differential. This form of adjustment has the disadvantage, however, that although it reduces backlash due to clearances between intermeshing teeth, it does not reduce clearances in the mounting of the gearing. There is the further disadvantage that axial adjustment of the one or more pinions outside a limited range, results in rough running of the differential.

It is an object of the present invention to provide a form of differential gear assembly that has low backlash and that may be used to overcome the above disadvantages.

According to the present invention, in a differential gear assembly in which two gear wheels are spaced apart from one another along a common axis of rotation and are each engaged by both of a pair of pinions, each pinion is rotatably mounted on an individual one of two members that are arranged for rotation together about said common axis with the individual axes of rotation of the two pinions extending radially of said common axis, and means is provided for urging angular displacement of said members, and thereby of the individual rotational axes of the pinions, with respect to one another about said common axis such that teeth of the pinions are urged against teeth of said gear wheels.

The said means for urging angular displacement of said members with respect to one another, may be a screw carried by one of the members to abut the other, or a spring that acts between them.

According to a feature of the present invention a bevel gear differential comprises two bevel-gears spaced apart from one another along a common axis of rotation, two members mounted for rotation together about said common axis, the two members being angularly displaceable with respect to one another about said common axis, two bevel-pinions carried by the two members respectively and each engaging both bevel-gears, the two pinions being mounted for rotation relative to their respective members about axes extending radially of said common axis, and means for urging angular displacement of said members with respect to one another about said common axis such as thereby to urge teeth of the pinions against teeth of the bevel-gears.

Figure 2:
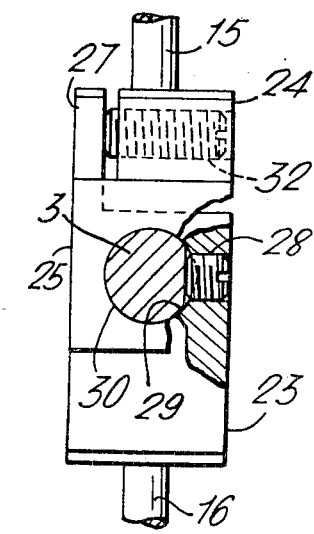
Figure 3:
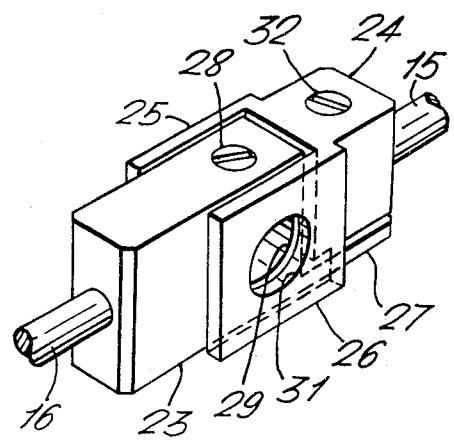
Figure 4:
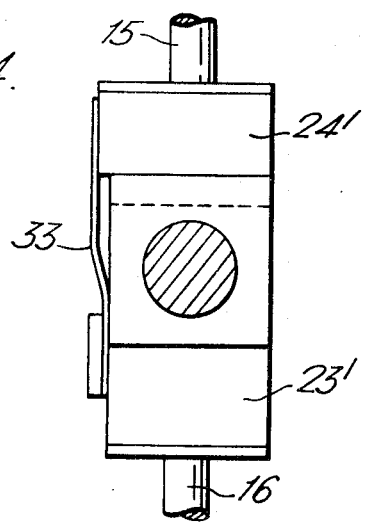

A bevel-gear differential according to the present invention will now be described, by way of example, with reference to the accompanying drawings, in which:

FIG. 1 is a section of the bevel-gear differential;
FIGS. 2 and 3 are respectively side and perspective views of a planetry gear assembly (with pinions removed) of the bevel-gear differential shown in FIG. 1; and
FIG. 4 is a side view corresponding to FIG. 2, of a modified form of the planetaray gear assembly.

Referring to FIG. 1, a pair of spaced bevel-gears 1 and 2 are rotatably mounted on a cylindrical shaft 3 by means of plain journal-bearings 4 and 5 respectively. The shaft 3, which acts as an output shaft of the differential, is journalled at one end of a support member 6, and at its other end in a support member 7. An anti-backlash gear 8 is secured, by means of its boss 9, to the shaft 3 for transmission of rotation of the shaft 3 from the differential.

A planetary gear assembly 10 is clamped to the shaft 3 at a point midway between the bevel-gears 1 and 2, and carries a pair of bevel-pinions 11 and 12. The pinions 11 and 12, which each engage both bevel-gears 1 and 2, are respectively mounted by means of plain journal-bearings 13 and 14 on shafts 15 and 16 of the planetary gear assembly 10. The pinions 11 and 12 are secured on their respective shafts 15 and 16 by means of circlips 17 that are spaced from the pinions 11 and 12 by washers 18.

The bevel-gears 1 and 2 are restrained from outward movement along the shaft 3 by abutment of the outer face of the bevel-gear 2 with the boss 9, and abutment of the outer face of the bevel-gear 1 with a washer 19 that is retained by a circlip 20 on the shaft 3. Anti-backlash gears 21 and 22 are carried by the bevel-gears 1 and 2 respectively, for use in applying rotary inputs to the differential. Any difference between the rotary inputs applied to the gears 21 and 22 results in relative rotation between the bevel-gears 1 and 2 about the shaft 3. Such relative rotation causes rotation of the pinions 11 and 12 about their respective shafts 15 and 16, with consequent rotation of the planetary gear assembly 10 clamped to the shaft 3. The shaft 3 is thus driven to rotate in accordance with the input difference.

Referring now also to FIGS. 2 and 3, the planetary gear assembly 10 (which is shown in FIGS. 2 and 3 without the pinions 11 and 12) includes a block 23 of generally rectangular form, and a block 24 having two parallel extension arms 25 and 26. The block 23 at one end carries the shaft 16, and at its other end is of reduced section to form a tongue 27, the block 24, which carries the shaft 15, being accommodated adjacent the tongue 27 with the extension arms 25 and 26 straddling the block 23. A grub-screw 28 clamps the block 23 to the shaft 3, the grub-screw 28 being screwed into the block 23 to impinge upon the shaft 3 within a cylindrical bore 29 of the block 23. The block 24, on the other hand, is rotatably mounted on the shaft 3 by means of plain journal-bearings 30 and 31 in the arms 25 and 26 respectively; however, the extent to which the block 24 has freedom for angular displacement about the shaft 3 relative to the block 23 is limited, being dependent upon the extent to which the clearances in the differential allow the pinions 11 and 12 freedom to move around the bevel-gears 1 and 2 out of axial alignment with one another. Adjustment of the angular position of the block 24 relative to the block 23 is achieved by means of a grub-screw 32 which is screwed through the block 24 to abut the tongue 27, and it is by means of such adjustment that backlash is reduced in the differential.

Backlash in the bevel-gear differential described above tends to arise firstly from clearances between the teeth of the bevel-gears 1 and 2 intermeshing with the teeth of the pinions 11 and 12, and secondly from bearing clearances, that is to say, clearances between the journal-bearings 4 and 5 and the shaft 3, and between the journal-bearings 13 and 14 and their respective shafts 15 and 16. Screwing-in of the grub-screw 32 results in change in the angular relationship between the shafts 15 and 16 about the shaft 3, the pinions 11 and 12 being urged to move towards one another in one sense (and away from one another in the opposite sense) around the circumferences of the bevel-gears 1 and 2. The effect of such movement urged upon the pinions 11 and 12 is threefold.

Firstly, there is a reduction in the clearance between the shaft 15 and the journal-bearing 13, as well as between the shaft 16 and the journal-bearing 14. This is because each of the shafts 15 and 16 is always urged in the same sense against the relevant one of the journal-bearings 13 and 14. The screwing-in of the grub-screw 32 urges the block 24 away from the tongue 27, and this tends to displace the shaft 15 angularly towards the shaft 16 in a sense which, when the assembly 10 is viewed (as with FIG. 2) from its left-hand side in FIG. 1, is clockwise about the shaft 3. Displacement of the pinion 11 with the shaft 15 is resisted by reaction from the teeth of pinion 11 engaging with the teeth of the gears 1 and 2, and this also sets up reaction from the teeth of pinion 12 engaging with teeth of the gears 1 and 2. Accordingly, the shaft 15 is constantly urged in the clockwise sense against the bearing 13 and the shaft 16 in the counter-clockwise sense against the bearing 14, irrespective of the sense of any rotation of the shaft 3.

Secondly, there is a reduction in the clearance at each of the four points where the teeth of the pinions 11 and 12 intermesh with the teeth of the bevel-gears 1 and 2. As indicated above, the pinions 11 and 12 are urged via the shafts 15 and 16 in clockwise and counter-clockwise senses respectively, against the bevel-gears 1 and 2. The pinion 11 is therefore biased to maintain one of its teeth in abutment with one of the teeth of the gear 1 and another in abutment with one of the teeth of the gear 2, opposite flanks of the teeth of the pinion 11 being involved in the contact in the two cases. Similar considerations apply in relation to abutment of the teeth of the pinion 12 with the teeth of the gears 1 and 2. The teeth of the two pinions 11 and 12 abut the teeth of each gear 1 and 2 on oppostie flanks, and so contact is maintained, obviating backlash between the intermeshing teeth, irrespective of sense of rotation of either gear 1 and 2.

Thirdly, there are reductions in the clearances between the shaft 3 and each of the journal-bearings 4 and 5. Each pinion 11 and 12 exerts a thrust, via the intermeshed teeth, on both bevel-gears 1 and 2. The thrusts exerted on each bevel-gear 1 and 2 by the two pinions 11 and 12 act at what are substantially opposite ends of a diameter, and their resultant has a component acting on the gear transversely of the shaft 3. Both bevel-gears 1 and 2 are therefore urged transversely against the shaft 3, to reduce the clearance between the shaft 3 and each journal-bearing 4 and 5.

These three inter-related reductions in clearance, which all result from adjustment of the single grub-screw 32, act together to reduce substantially the free-play in the differential, and thereby virtually eliminate backlash. Further, the reduction in backlash is achieved without the need for undue high-precision manufacture of the component parts of the differential.

The flanks of each gear-tooth of a bevel-gear differential are so shaped as to ensure smooth and efficient running of the differential, and to this end have a curvature which varies along the length of the gear-tooth. Accordingly, in the differential described above, there is an optimum arrangement of the bevel-gears 1 and 2 in relation to the pinions 11 and 12, and deviation of any one of these bevel-gears or pinions from position in this optimum arrangement results in rough running of the differential. An advantage of the above-described form of bevel-gear differential lies in the fact that the adjustment to reduce backlash is achieved by moving the pinions 11 and 12 circumferentially with respect to the bevel-gears 1 and 2. Such movement of the pinions 11 and 12 does not disturb the optimum arrangement, so that the adjustment to reduce backlash does not result in rough running of the differential.

The grub-screw 32 in the bevel-gear differential described above with reference to FIGS. 1 to 3 may be replaced by a spring to urge the blocks 23 and 24 apart. In particular, the differential of FIGS. 1 to 3 may be modified as shown in FIG. 4 to incorporate a leaf-spring 33 that is carried by a block 23′ corresponding to the block 23, and bears upon a block 24′ corresponding to the block 24. The use of a spring in this manner, has the advantage that it is effective to compensate for non-uniform clearances, due, for example, to eccentricities in any of the gear-members, shafts, or bearings. It is necessary, however, to ensure that the spring is strong enough to maintain its effect under the conditions of maximum torque applied between the inputs and output of the differential.

The form of bevel gear differential described above is very suited to use in a precision-instrument servo-system of small size. In particular a differential gear assembly for this purpose has been constructed as shown in FIG. 1 to have an overall length and overall diameter bolts somewhat less than one inch.

I claim:
1. A differential gear assembly comprising two toothed gears spaced apart from one another along a common axis of rotation, a pair of toothed pinions for engaging with the two gears, and means mounting the two pinions for rotation about said common axis relative to said gears with teeth of each pinion engaging teeth of both said gears, said mounting means comprising two members mounted for rotation together about said common axis, the two members being angularly displaceable with respect to one another about said common axis, means mounting the two pinions on said two members respectively, each pinion being mounted on its respective member for rotation relative thereto about an axis extending radially of said common axis, and means for urging angular displacement of the two members with respect to one another about said common axis so as thereby to urge the teeth of the pinions against the teeth of both said gears, and wherein said means for urging angular displacement of said members with respect to one another, is a screw that is carried by one of said members to abut the other.

2. A differential gear assembly according to claim 1 including a rotatably-mounted shaft, means rotatably mounting each said gear on said shaft, means mounting a first of said two members on said shaft to rotate therewith, and means mounting the second of said two members on said shaft for angular displacement with respect to said first member.

3. A bevel gear differential comprising two bevel-gears spaced apart from one another along a common axis of rotation, two members mounted for rotation together about said common axis, the two members being angularly displaceable with respect to one another about said common axis, two bevel-pinions carried by the two members respectively and each engaging both bevel-gears, means mounting the two pinions for rotation relative to their respective members about axes extending radially of said common axis, and means for urging angular displacement of said members with respect to one another about said common axis such as thereby to urge teeth of the pinions against teeth of the bevel-gears, and wherein said means for urging angular displacement of said members with respect to one another, is a screw that is carried by one of said members to abut the other.

4. A bevel gear differential according to claim 3 including a rotatably-mounted shaft having the said bevel-gears rotatably mounted thereon, means mounting a first of said members on said shaft to rotate therewith, and means mounting the second of said members on said shaft for angular displacement with respect to said first member.

5. A bevel gear differential comprising a rotatably-mounted shaft, two bevel-gears rotatably mounted on the shaft to have a common axis of rotation collinear with the rotational axis of the shaft, said bevel-gears being spaced apart from one aonther along said common axis, two members mounted for rotation together about said common axis, means mounting a first of said members on said shaft to rotate therewith, bearings mounting the second of said members rotatably on said shaft for angular displacement with respect to said first member, said second member having a pair of arms that straddle said first member and incorporate the said bearings mounting said second members rotatably on said shaft, two bevel-pinions carried by the two members respectively and each engaging both bevel-gears, means mounting the two pinions for rotation relative to their respective members about axes extending radially of said common axis, and means for urging angular displacement of said members with respect to one another about said common axis such as thereby to urge teeth of the pinions against teeth of the bevel-gears.

6. A bevel gear differential according to claim 5 wherein said means for urging angular displacement of said members with respect to one another, is a screw that is carried by one of said members to abut the other.

7. A bevel gear differential according to claim 5 wherein said means for urging angular displacement of said members with respect to one another, is a spring that acts between the two members.

8. A bevel gear differential according to claim 7 wherein said spring is a leaf-spring carried by one of said members to bear upon the other.

References Cited

UNITED STATES PATENTS 3,012,449  12/1961  Stockwell _____ 74—713

LEONARD H. GREEN, Primary Examiner

U.S. Cl. X.R.

74—409